(12) United States Patent
Tchakarov

(10) Patent No.: US 8,314,546 B2
(45) Date of Patent: Nov. 20, 2012

(54) LUMINOUS PANEL

(75) Inventor: Svetoslav Tchakarov, Arcueil (FR)

(73) Assignee: Saint-Gobain Glass France, Courbevoie (FR)

( * ) Notice: Subject to any disclaimer, the term of this patent is extended or adjusted under 35 U.S.C. 154(b) by 27 days.

(21) Appl. No.: 12/296,577

(22) PCT Filed: Apr. 6, 2007

(86) PCT No.: PCT/FR2007/051087
§ 371 (c)(1),
(2), (4) Date: Oct. 9, 2008

(87) PCT Pub. No.: WO2007/119019
PCT Pub. Date: Oct. 25, 2007

(65) Prior Publication Data
US 2009/0278448 A1 Nov. 12, 2009

(30) Foreign Application Priority Data
Apr. 13, 2006 (FR) ...................................... 06 51348

(51) Int. Cl.
*H01L 51/52* (2006.01)
*F21V 13/00* (2006.01)
(52) U.S. Cl. ........................................ 313/504; 362/242
(58) Field of Classification Search ........... 313/498–512
See application file for complete search history.

(56) References Cited

U.S. PATENT DOCUMENTS

| 6,358,632 | B1 | 3/2002 | Dickey et al. | |
|---|---|---|---|---|
| 6,645,645 | B1 | 11/2003 | Adachi et al. | |
| 2003/0098840 | A1 | 5/2003 | Nagatani | |
| 2005/0169012 | A1* | 8/2005 | Takeuchi | 362/602 |

FOREIGN PATENT DOCUMENTS

| EP | 1 533 632 | 5/2005 |
|---|---|---|
| GB | 2 168 519 | 6/1986 |

* cited by examiner

*Primary Examiner* — Anh Mai
*Assistant Examiner* — Zachary J Snyder
(74) *Attorney, Agent, or Firm* — Oblon, Spivak, McClelland, Maier & Neustadt, L.L.P.

(57) ABSTRACT

The invention relates to a luminous panel (100) comprising:
a transparent flat substrate (1) having an edge face (13), two main faces (11, 12) and a given thickness;
at least one direct light region (31, 32) by means of a light source (2) associated with one of the main faces (12);
a source (2) of visible and/or ultraviolet radiation, said radiation being guided by total reflections in the thickness of the substrate; and
at least one extraction zone (41) for extracting the guided radiation, said extraction zone being associated with one of the main faces in order to form another luminous region (33) separate from the direct light region,
and, on the same side as the main face (11) associated with the extraction zone (41), the direct light region (31) has a lower luminance than the luminance of the other luminous region (33).

24 Claims, 3 Drawing Sheets

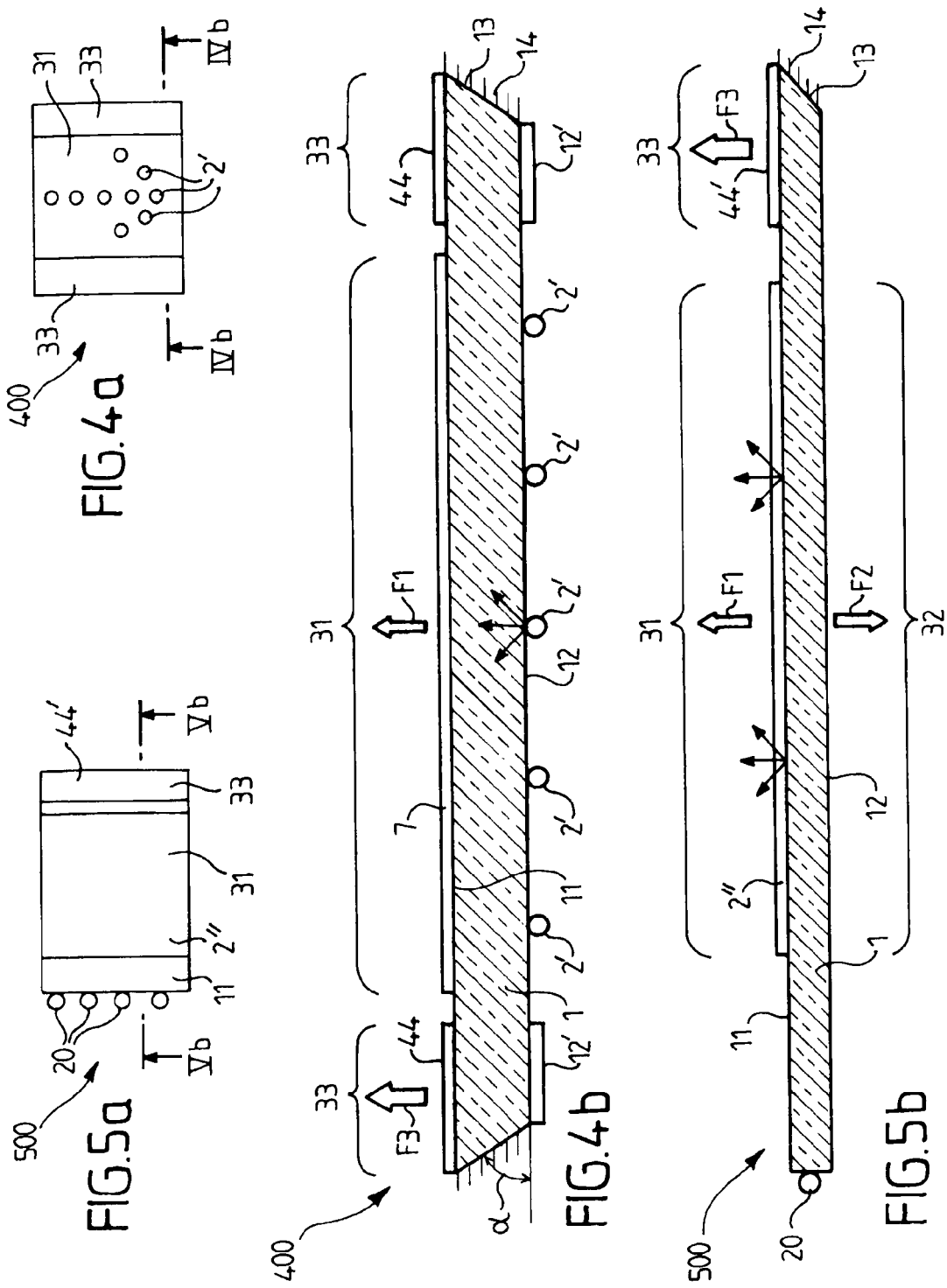

LUMINOUS PANEL

The invention relates to the field of illumination and more particularly to luminous panels.

One luminous panel already known comprises a flat transparent substrate, made of glass or plastic, provided on one of its main faces with an electroluminescent device of the OLED (Organic Light Emitting Diode) type. This panel emits uniform light via the face on the opposite side from the face bearing the OLED device.

The invention proposes to widen the range of luminous panels available, by improving the optical performance and/or by integrating novel optical functionalities.

For this purpose, the subject of the invention is a luminous panel comprising:
- a transparent flat substrate having an edge face, two main faces and a given thickness;
- at least one direct light region by means of a light source associated with one of the main faces;
- a visible and/or ultraviolet radiation source, said radiation being guided by total reflections in the thickness of the substrate; and
- at least one extraction zone for extracting the guided radiation, said extraction zone being associated with one of the main faces in order to form another luminous region separate from the direct light region, and, on the side of the main face associated with the extraction zone, the direct light region has a lower luminance then the luminance of the other luminous region.

The luminous panel according to the invention therefore provides luminous regions that are essentially geographically separate (however, restricted overlapping regions are possible) and are of separate or essentially separate origin. The light source produces radiation in the visible.

In the essentially direct light region, the light essentially comes from this light source, leads directly by refraction from the associated face and/or passes through the substrate, and leaves via the other face, again by refraction.

In the other separate luminous region, the light essentially comes from extracted guided radiation in the visible and/or ultraviolet (UV). Of course, the substrate serves in particular to guide light and/or UV.

To form the other luminous region, the extraction zone in its entirety or at least the major portion of the extraction zone is of course not facing the light source. The extraction zone may be substantially on the same side of the substrate as the light source, for example in the same plane as the light source, especially adjacent and contiguous with the light source. The extraction zone may also be on the other side of the substrate.

The panel may comprise several extraction zones in order to form several luminous regions. The extraction zone(s) may be continuous or discontinuous.

Essentially geographically separate luminous regions of essentially separate origin allow the optical characteristics of the luminous panel to be adjusted according to requirements. This also makes it possible to obtain luminous regions of different colors and/or different geometries and/or having different optical functions. These two types of region may or may not be simultaneously luminous and may or may not be independently controlled.

The extraction zone(s) may serve for example to enhance the illumination provided by the direct light region, especially for architectural illumination, or else to signal the luminous panel.

The luminous panel according to the invention may be used both outdoors and indoors, and the transparent substrate may be of any size, for example of the order of 1 $m^2$.

The direct light may be uniform. For example, one or more surface sources may be chosen. It is also possible to choose an array of practically point-like sources, these sources being for example lit intermittently, especially for decorative illumination.

Furthermore, unlike the luminous panel of the prior art in which a great amount of light is lost in the substrate, the luminous panel according to the invention also uses guided radiation to create light.

The luminous panel according to the invention may have for example an overall average luminance equal to the luminance of the already known uniform luminous panel, while still having, in the direct light region, a luminance less than that of the already known panel. In this way, the power consumption is reduced owing to the supply of light by extraction—the luminous efficiency is thus increased.

The luminous panel according to the invention may also have an overall luminance greater than the luminance of the already known panel, without increasing the power consumption.

The luminous panel according to the invention provides illumination that is not uniform, that is to say is not uniformly distributed over one of the main faces or on both main faces. The luminous panel according to the invention provides differentiated illumination, most particularly according to the type of luminous region, for example by producing both architectural and decorative illumination, or architectural and indicating illumination, or architectural illumination and a display, for example of the design, logo, alphanumeric signaling type, especially for teaching purposes, and emergency exits.

One or both of the main faces may be entirely illuminated without however being uniform. For example, on the face associated with the light source, the direct light region may be contiguous with the extraction zone. On the border of a direct light region and an extraction light region, the light may both issue directly from the light source and issue from the extracted guided radiation, for example the radiation backscattered in the substrate.

One or both of the main faces may furthermore include one or more continuous or discontinuous, nonluminous (dark) regions.

The two main faces may each have a direct light region and their luminances L1 and L2 may be substantially identical or intentionally different, for example with a difference of greater than 10% or even 30%. In particular, it is preferable to increase the amount of light directed toward the substrate in order to promote guiding and thus increasing the luminance of the extraction zone(s).

For example, L1 (on the opposite side from the light source) is chosen to be at least twice L2, or even three times L2 (on the same side as the light source).

Typically, for visual comfort, L1 may be equal to 1200 $cd/m^2$ or less, for example 1000 $cd/m^2$, and L2 may be equal to 500 $cd/m^2$ or less, for example 300 $cd/m^2$.

In a preferred embodiment, the direct light region occupies an area equal to at least 50% of the area of the substrate, or more preferably 80%, and especially in the center of the substrate.

The direct light region may be continuous. The direct light region may also be discontinuous, for example in the form of a number of surface luminous regions of given geometry (rectangular and/or square and/or round, etc.), possibly uniformly spaced apart and with a total area of at least 50%, or even 80%, of the area of the substrate.

Furthermore, alternatively or in addition, the extraction zone(s) may occupy a total area not exceeding 30%, even more preferably not exceeding 10%, of the area of the substrate.

The extraction zone or zones are preferably in the form of one or more bands of light, especially uniform ones, and preferably placed on the periphery of one of the faces. These bands may for example form a highly luminous frame.

The smaller the area of the extraction zone, the higher the luminance L3. The luminance L3 may easily be 1500 cd/m$^2$ or higher, for example about 3000 cd/m$^2$.

In one embodiment of the invention, at least when the light source is not lit, in the direct light region the panel is semireflective or reflective. The panel may preferably form a mirror in the direct light region, for example by means of a mirror attached to one of the faces of the substrate (metal foil, stainless steel plate for example) or by means of a metal, especially silver, layer on one of the faces of the substrate.

Preferably, the mirror may be placed on the face associated with the light source. The mirror may especially be the rear of this source, that is to say further away from the substrate than the source. In this configuration, the guided radiation is not lost by absorption in the mirror and it is possible to obtain a particularly high luminance in the extraction zone. In a device having an electroluminescent layer, the electrode furthest from the substrate may form the mirror.

If it is desired to give preference to illumination on only one side in the direct light region, the mirror may be placed on the opposite face from the light source. Of course, in this configuration, direct light produced by the light source in the direction of the substrate is reflected by the mirror and then exits in this region.

Since the direct light exits via a single face, this makes it possible for example to increase the direct light in a room. For example, the panel is a tile or a ceiling or a luminous mirror.

The panel may also form a mirror when the source is lit, at the very least on that side of the face with this mirror.

In another embodiment of the invention, in the direct light region, when the light source is turned off, the panel is transparent or generally transparent, especially with a possibly overall light transmission $T_L$ of greater than 20%, preferably 50% or higher and even more preferably 70% or higher, and a light reflection $R_L$ of 50% or less, preferably 30% or less.

The panel is said to be overall transparent in the direct light region if it comprises a material capable of absorbing or reflecting a substantial fraction of the visible light (for example by forming part of the light source), this material being, however, distributed in this region so that the visible light is sufficiently transmitted. For example, this material forms a mesh.

By setting a high overall light transmission $T_L$, when the light source is not lit, it is thus possible to produce, for example, an illuminating window. The illumination of a room is therefore improved, but not to the detriment of the light transmission. Furthermore, by limiting the light reflection, especially on the outside of the illuminating window, this also allows the level of reflection to be controlled, for example so as to meet the antidazzle standards in force for building facades.

Furthermore, in this other embodiment in particular, the light source may preferably be a surface source, especially a device consisting of an organic or inorganic electroluminescent layer. This surface source when lit may furthermore be capable of preserving intimacy, at least at night or in a relatively dark environment.

The light source may be monochromatic, especially blue and/or green and/or red, or it may be adapted so as to produce white light.

The light source may be chosen from at least one of the following sources:
 a plurality of light-emitting diodes (LEDs);
 a photoluminescent layer that can be excited in the UV, in particular the near-UV (about 360 to 400 nm) or in the visible, preferably combined with an electroluminescent device (an LED, a device having an electroluminescent layer, etc.) that produces the exciting (primary) radiation, the photoluminescent layer preferably being substantially transparent; and
 a device having an organic or inorganic electroluminescent layer, especially of the OLED, PLED type, a TFEL device or a TDEL device.

Each of these sources are discussed further below.

The diode-type light source may be encapsulated, that is to say it may comprise a semiconductor chip and a package, for example one in which the chip is encapsulated in an epoxy resin or in PMMA. The functions of this package may be several: protection from oxidation and moisture, diffusing or collimating element, wavelength conversion, etc.

The diode may for example be a semiconductor chip with no collimating lens, for example with a size of the order of a hundred μm or 1 mm, and possibly with minimal encapsulation, for example for protection.

Thus, the diode may be chosen in particular from at least one of the following light-emitting diodes:
 a diode whose principal direction of emission is perpendicular or preferably oblique to the associated main face, in order to promote guiding;
 a diode having two main emission directions that are oblique to the emitting surface of the diode and to the associated main face, giving a batwing shape, the two directions being for example centered on angles between 20 and 40° and between −20 and −40° with apex half-angles of around 10° to 20°; and
 a diode having one or two main emission directions that are oblique to the emitting surface of the diode, the two directions being centered on angles for example between 60 and 85° and between −60 and −85°, with apex half-angles of around 10° to 30°.

Typically, a collimated diode may have an apex half-angle that may be as small as 2 or 3°.

The diode may be a "high-power" diode, that is to say one having a power greater than 0.2 W, or a diode with a luminosity of greater than 5 lumens.

However, it is preferred to avoid excessively intense light spots, and to choose for example a batwing-type diode.

The light source, which is a photoluminescent layer, is typically a layer based on phosphor particles in a matrix. The matrix may for example be inorganic and may comprise, for example, a silicon alkoxide polymerization/polycondensation product such as tetraethoxysilane (TEOS), tetramethoxysilane (TMOS), methyltriethoxysilane (MTEOS) and the like. These precursors of the matrix offer excellent compatibility with many phosphor particles.

The phosphor particles may advantageously be selected from a wide palette of colors in order to determine the color of the direct light region.

Thus, it is possible to choose from phosphor particles emitting at different wavelengths, which are combined, individualized and homogenized so as to produce yellow or white light.

Phosphor particles that are identical or emit different wavelengths may also be combined in variable compositions and/or concentrations so as to form signs, such as written signs or the like, or any other purpose, especially for decorative purpose.

Preferably, to maintain a satisfactory light transmission, when the photoluminescent layer is relatively opaque, its extent (width) is limited, for example the layer is discontinuous in the form of regions with a width of a few tens of mm. Nevertheless, luminous efficiency is maintained.

As excitable phosphor particles, especially those that can be sighted in the near-UV, mention may be made of CaS:(Eu, Tm)$^{2+}$ emitting in the red, $SrAl_2O_4$:$Eu^{2+}$ emitting in the green and $Y_3Al_5O_{12}$:Ce emitting in the yellow.

Advantageously, the phosphor particles may have dimensions of at most 100 nm, preferably 30 nm and even more preferably 10 nm, and the assembly that they form with the matrix is transparent. These phosphor particles may be in an organic, especially aqueous, alcoholic, suspension.

Mention may for example be made of what are called "core-shell" particles, for example based on ZnS for the shell and CdSe for the core.

Of course, the panel may also include a photoluminescent layer in order to convert the wavelength of the direct light source. For example, mention may be made of ZnS:Cu emitting in the yellow-green or $Y_3Al_5O_{12}$:Ce emitting in the yellow from blue.

The light source may be an electroluminescent device with two electrodes, preferably in the form of electronically conducting layers.

The electrode further from the substrate may however be a metal foil or plate and may also form a mirror (especially one made of copper, stainless steel or aluminum).

In the configuration in which the light source produces guided light, the electronically conducting layer closer to the substrate, generally the bottom electrode, is chosen to be transparent, especially with a light transmission $T_L$ of 50% or higher, especially 70% or higher and even 80% or higher.

This electronically conducting layer may be chosen from metal oxides, especially the following materials: a tin-doped oxide, especially fluorine-doped tin oxide $SnO_2$:F or antimony-doped tin oxide $SnO_2$:Sb (the precursors that can be used in the case of deposition by CVD may be tin halides or organometallics associated with a fluorine precursor of the hydrofluoric acid or trifluoracetic acid type), doped zinc oxide, especially aluminum-doped zinc oxide ZnO:Al (the precursors that can be used in the case of deposition by CVD may be zinc and aluminum halides or organometallics) or gallium-doped zinc oxide ZnO:Ga, or else doped indium oxide, especially tin-doped indium oxide ITO (the precursors that can be used in the case of deposition by CVD may be tin and indium halides or organometallics) or zinc-doped indium oxide (IZO).

More generally, it is possible to use any type of transparent electronically conducting layer, for example a TCO (Transparent Conductive Oxide) layer, with a thickness for example of 2 to 100 nm. It is also possible to use a thin metal coating or TCC (Transparent Conductive Coating), for example made of Ag, Al, Pd, Cu or Au and typically with a thickness between 2 and 50 nm.

Of course, for applications in which transparency is necessary in the direct light region, both electrodes are transparent.

The electronically conducting layer further from the substrate may be opaque, reflective, metallic, especially one comprising an Al, Ag, Cu, Pt or Cr layer, obtained by sputtering or evaporation.

Moreover, the device may preferentially be provided with at least one barrier layer, especially acting as a barrier to alkali metals, which is inserted between said chosen glass substrate and the electrode closer to the substrate.

This layer possessing alkali-metal barrier properties may be based on a dielectric, chosen from at least one of the following compounds: silicon nitride or oxynitride, aluminum nitride or oxynitride, silicon oxide or oxycarbide, with a thickness between 20 and 150 nm.

The barrier layer may contain an alternation of layers having a high refractive index, between 1.9 and 2.3, and layers having a low refractive index, between 1.4 and 1.7, especially in $Si_3N_4$/$SiO_2$ or $Si_3N_4$/$SiO_2$/$Si_3N_4$ sequences.

The light source may be an electroluminescent device with an inorganic or organic electroluminescent layer.

An inorganic electroluminescent layer is referred to as a TFEL (Thin Film Electroluminescent) layer. This system generally includes a phosphor layer and at least one dielectric layer.

For example, the dielectric layer may be based on the following materials: $Si_3N_4$, $SiO_2$, $Al_2O_3$, AlN, $BaTiO_3$, $SrTiO_3$, HfO, $TiO_2$.

The phosphor layer may be composed for example of the following materials: ZnS:Mn, ZnS:TbOF, ZnS:Tb, SrS:Cu, Ag, SrS:Ce or oxides such as $Zn_2SiO_4$:Mn.

Examples of inorganic electroluminescent multilayers are for example described in document U.S. Pat. No. 6,358,632.

The dielectric layer may be thick (a few microns). It is then referred to as a TDEL (Thick Dielectric Electroluminescent) layer. Examples of TDEL production are given in document EP 1 182 909.

Diodes with an organic electroluminescent layer are referred to as OLEDs. In general, OLEDs can be broken down into two large families depending on the organic material used. If the organic electroluminescent layers are polymers, the diodes are referred to as PLEDs (Polymer Light-Emitting Diodes). If the electroluminescent layers consist of small molecules, the diodes are referred to as SM-OLED (Small-Molecule Organic Light Emitting Diodes).

One example of a PLED consists of the following multilayer: a 50 nm layer of poly(styrene sulfonate)-doped poly(2, 4-ethylene dioxythiophene) (PEDOT:PSS) and a 50 nm layer of phenyl poly(p-phenylenevinylene) (Ph-PPV). The top electrode may be a layer of Ca.

In general, the structure of an SM-OLED consists of a multilayer comprising hole-injection layers, hole-transport layer, emissive layer, electron-transport layer.

One example of a hole-injection layer is copper phthalocyanine (CuPC), the hole-transport layer may for example be N,N'-bis(naphthalene-1-yl)-N,N'-bis(phenyl)benzidine (α-NPB). The emissive layer may for example be a layer of fac-tris(2-phenylpyridine)iridium [Ir(ppy)$_3$]-doped 4,4',4''-tri(N-carbazolyl)triphenylamine (TCTA). The electron-transport layer may be composed of aluminum tri-(8-hydroxyquinoline) (Alq$_3$) or bathophenanthroline (BPen). The top electrode may be a layer of Mg/Al or LiF/Al.

Examples of organic electroluminescent multilayers are for example described in the document U.S. Pat. No. 6,645,645.

In a first advantageous design of the invention, said light source may form, or more preferably constitute, the source of said guided radiation, chosen to be in the visible.

In this case, a large portion of the light injected into the substrate at angles equal to or greater than the angle of total reflection in order to form the separate light region is thus recovered.

This light source may for example have a Lambertian emission pattern.

A luminous panel according to the invention may have a single electrical UV and/or visible radiation source and, more precisely, said light source, which is associated with one of the main faces, may be a single source and preferably electrical source.

Even more preferably, this visible light source may consist of an electroluminescent device, for example a device such as those already described above (LED series, of the OLED type, etc.)

In this way, the luminous panel is both of simple design and high performance, and is also inexpensive.

In a second design of the invention, a source of guided radiation is chosen to be UV, preferably near-UV, radiation, and the source is then placed on the edge face.

This UV source may be a simple semiconductor chip. This source may furthermore be placed in a recessed region of the edge face or may be bonded to the edge face, which may be beveled or convex. In particular, to limit reflections, an adhesive with an optical refractive index intermediate between the index of the guide and that of the external medium or, as the case may be, that of the lens is chosen. The recessed region may form a slot along the guide, to house a plurality of sources, said slot being non-emergent or emergent on at least one side, especially so as to facilitate side mounting. The bottom of the hole may be flat, concave, convex, spherical, hyperbolic or aspherical. This source may be in a means for protecting and/or holding the source, which is inside the recessed, especially U-shaped, region and/or which occupies most of the recessed region. This means may be fastened to the coupling edge face by adhesive bonding, by snap-fastening, by bolts, etc.

In this second design of the invention, the light source comprises a photoluminescent layer that can be excited by said UV, preferably near-UV, radiation and is preferably substantially transparent.

The light source may be directed on one of the main faces, especially in a recess provided for this purpose, or on an attached element. Likewise, the extraction zone(s) may be directly on one of the main faces or on a suitable attached element.

In one advantageous embodiment, the light source is directly on one of the main faces in order to optimize the injection of light into the substrate.

For example, with an electroluminescent device as light source, one of the electronically conducting layers is directly deposited on the substrate (or the barrier sublayer). LED diodes may be placed on the face, for example in a hole. A photoluminescent layer may be deposited directly on the main face.

Preferably, to facilitate the manufacture of the panel, the extraction zone may be associated with the opposite main face from the face with the light source.

The light source may be bonded, or preferably laminated, to another flat, preferably transparent, substrate such as a glass, using a lamination interlayer, especially one that is extra clear.

It is possible to choose to form a laminated glass. The lamination interlayer may be a transparent plastic film such as a film of polyvinyl butyral (PVB) or ethylene/vinyl acetate (EVA). It is also possible to use a transparent adhesive resin.

Alternatively, the substrate may form the glass pane of a multiple glazing unit, (made of a composite or glass), especially a double glazing unit. Preferably, the light source may be placed on the inside of the double glazing unit, with a layer of gas, especially an inert gas (for example argon).

Light is extracted by at least one of the following means placed in said extraction zone:
- a diffusion layer, preferably based on mineral particles and preferably with a mineral binder;
- the substrate, rendered diffusing, especially textured or rough; and
- a diffusion element, especially a textured or rough one, attached to the substrate, preferably having substantially the same refractive index.

When the guided radiation is visible radiation, the diffusion layer may be based on particles that scatter visible light and possibly phosphor particles excited in the visible, in order to change color.

The particles scattering in the visible may in particular have dimensions between 100 nm and 1 μm, especially between 300 and 700 nm, such as alumina particles, or phosphor particles themselves; these visible-light-scattering particles are dielectrics, semiconductors or conductors.

Phosphor particles with dimensions between 30 and 500 nm, especially dimensions of at least 400 nm, are also capable of scattering visible light. This may make it unnecessary to add other scattering particles.

When the guided radiation is UV radiation, the diffusion layer may be based on scattering particles and UV-excited phosphor particles emitting in the visible. The extraction zone may also include a UV-diffusion first layer and an external layer based on phosphors emitting in the visible.

The substrate rendered diffusing by texturing it may typically be formed from regular geometric patterns, with dimensions between a few μm and a few mm, for example prisms or even microlenses with dimensions between 5 and 10 μm.

A substrate rendered diffusing by roughening it may typically have a roughness between a few μm and a few mm.

The transparent substrate may be parallelepipedal, with rectangular or square main faces or even main faces of any other shape (round, oval, polygonal etc.). This substrate may be large, for example with an area greater than 0.5 or 1 m$^2$.

The transparent substrate may be made of any transparent plastic, such as polycarbonate, polyvinyl butyral, a polyolefin, especially polyethylene, polypropylene or polyethylene terephthalate, polyurethane, an acrylic polymer such as polymethyl methacrylate, and ionomer resin, or various copolymers.

In one advantageous embodiment, the transparent substrate is glass and preferably with at least one microtextured, sandblasted or acid-etched region in order to form the diffusion extraction zone.

Moreover, at least one of the edges of the edge face (preferably both edges) makes, with the main face associated with the light source, an external angle equal to or greater than 45°, preferably equal to or greater than 80°, but less than 90°, in order to redirect the radiation onto a wider extraction zone. The edge face may thus be beveled.

At least one of the edges of the edge face (preferably both edges of the edge face) may be reflective and preferably comprise a mirror, in order for the guided radiation to be optimally recycled.

The region facing an extraction zone, located on the opposite face, may also be reflective in order to mask this extraction zone and/or to redirect the backscattered light.

To limit the guided radiation losses, the transparent substrate may be a glass having an absorption coefficient of less than 2.5 m$^{-1}$, preferably less than 0.7 m$^{-1}$, at the wavelength of the guided radiation.

For example, soda-lime-silica glass with less than 0.05% FeIII or $Fe_2O_3$, especially the glass "Diamant" from Saint-Gobain Glass, the glass "Optiwhite" from Pilkington or the glass "B270" from Schott is chosen. Any of the extra-clear glass compositions described in the document WO 04/025334 may be chosen.

In one advantageous design of the invention, the thickness of said transparent substrate may be at least 1 mm, preferably at least 5 mm, in order to reduce the number of internal reflections and thus extract more guided radiation, thereby favoring the separate luminance region.

Furthermore, it may be advantageous to incorporate a coating of given functionality into the luminous panel according to the invention. This may be a coating with the function of blocking infrared-wavelength radiation (for example using one or more silver layers surrounded by dielectric layers or layers of nitrides such as TiN or ZrN, or metal oxides or steel or an Ni—Cr alloy), with a low-emissivity function (for example made of doped metal oxide such as $SnO_2$:F or a tin-doped indium oxide (ITO) or one or more silver layers), an antifogging function (using a hydrophilic layer), an antifouling function (a photocatalytic coating comprising $TiO_2$ at least partially crystallized in anatase form), or else an antireflection multilayer of the $Si_3N_4/SiO_2/Si_3N_4/SiO_2$ type for example.

With a surface light source provided with electronically conducting layers, one of the electronically conducting layers may have a low-emissivity function and/or a solar-controlled function.

The luminous panel according to the invention may form, according to choice, (as alternatives or as combinations): a decorative or architectural luminous system; a display panel, for example of the drawing, logo or signaling type, especially alphanumeric type; and an indicating element, for example emergency exit display.

In general, the luminous panel according to the invention may equip any window in a building or means of locomotion (train window, ship or aircraft cabin window, sunroof, industrial vehicle side window, or even a portion of a rear window or windshield).

It is also conceivable for the luminous panel according to the invention to equip glazing, a glazed door, especially a sliding door, an internal partition between two rooms in a building, especially in an office, or between two regions/compartments of a means of land, air or sea locomotion, or for equipping a shop window or any type of container.

The luminous panel according to the invention may also be intended for urban furniture and/or for interior furnishings.

The luminous panel may in particular be an illuminating tile, a ceiling, a bus shelter panel, a wall of a display cabinet, a jeweler's display case or a shop window, a shelf or furniture element, a front face for an item of furniture, an illuminating refrigerator shelf, an aquarium wall, or a greenhouse. It may also be an illuminating mirror. The luminous panel may be used for lighting a bathroom wall or a kitchen worktop.

The present invention will be better understood on reading the detailed description below of nonlimiting exemplary embodiments and on examining the following figures, in which:

FIGS. 1*a* and 1*b* show, respectively, schematic front and lateral sectional views of a luminous panel according to a first embodiment of the invention;

FIGS. 4*a* and 4*b* show, respectively, schematic front and longitudinal sectional views of a luminous panel in a fourth embodiment of the invention; and FIGS. 5*a* and 5*b* show, respectively, schematic front and longitudinal sectional views of a luminous panel in a fifth embodiment of the invention.

It should be pointed out that, for the sake of clarity, the various elements of the objects (including the angles) shown are not necessarily drawn to scale.

Figure 1A:
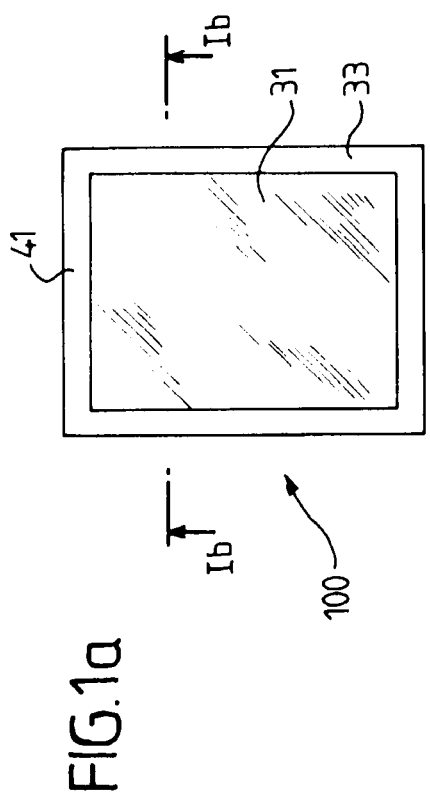
Figure 1B:
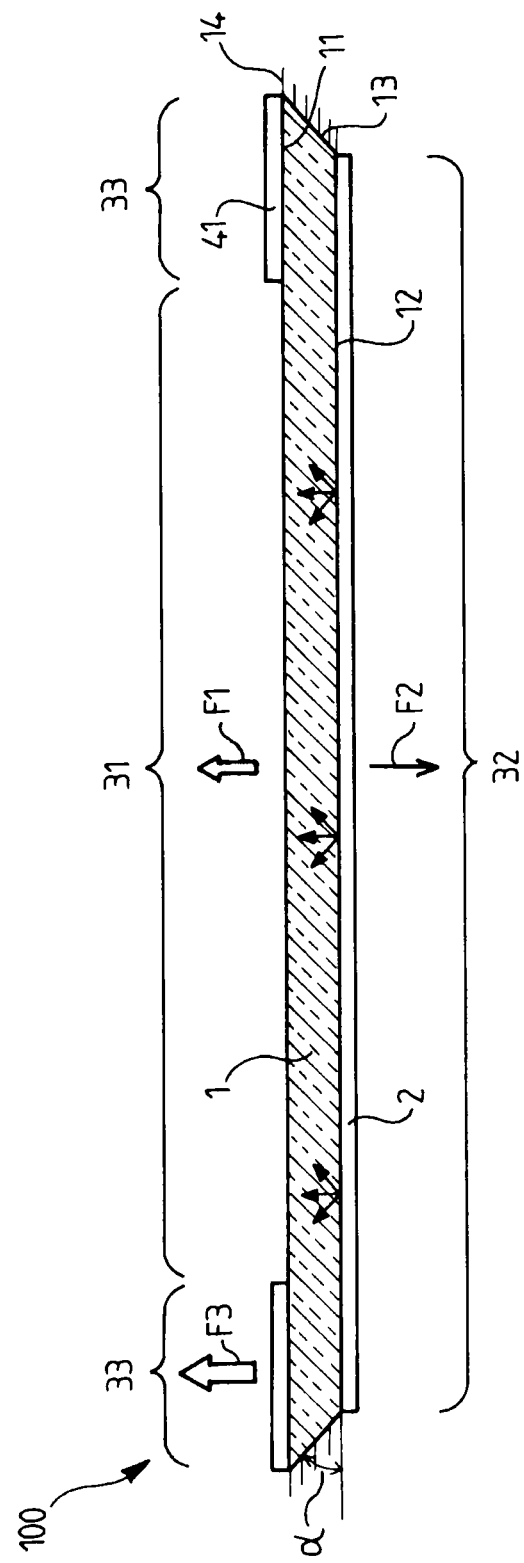

FIGS. 1*a* and 1*b* show, respectively, schematic front and lateral sectional views of a luminous panel 100 in a first embodiment of the invention.

This luminous panel 100 firstly comprises a flat transparent substrate, preferably a sheet of glass 1, preferably thick, for example 4 or 6 mm in thickness, and with absorption coefficient in the visible of 2.5 m$^{-1}$ or less. It is preferred to choose an extra clear soda-lime-silica glass with an absorption coefficient in the visible or near-UV of less than 0.7 m$^{-1}$. This glass sheet 1 has first and second parallel main faces 11, 12 and an edge face 13.

An OLED, PLED and TFEL electroluminescent device 2 comprising an electroluminescent layer interposed between two electrodes is placed on the second main face 12.

As an example, an organic electroluminescent device, for example of the OLED type, comprises, on the face 12, in this order;

optionally, an alkali barrier layer, for example a layer of silicon nitride or oxynitride, aluminum nitride or oxynitride, a silicon oxide or oxycarbide or else an alternation of layers having a high refractive index, between 1.9 and 2.3, and layers having a low refractive index, between 1.4 and 1.7, especially according to the sequences $Si_3N_4/SiO_2$ or $Si_3N_4/SiO_2/Si_3N_4$;

a first electrode, which is a (monolayer or multilayer), called rear or bottom electrode;

an organic electroluminescent (OLED) system typically formed from:
a layer of α-NPD,
a layer of TCTA+Ir(ppy)$_3$,
a layer of Bphen, and
a layer of LiF;
a second electrode (which is a monolayer or multilayer) called the front or top electrode.

Alternatively, a TFEL-type electroluminescent device comprises on the face 12, in this order:

optionally, an alkali barrier layer, for example a silicon nitride or oxynitride, aluminum nitride or oxynitride, a silicon oxide or oxycarbide or else an alternation of layers having a high refractive index, between 1.9 and 2.3, and layers having a low refractive index, between 1.4 and 1.7, especially according to the sequences $Si_3N_4/SiO_2$ or $Si_3N_4/SiO_2/Si_3N_4$;

a first electrode, which is a (monolayer or multilayer), called rear or bottom electrode;

an inorganic electroluminescent (TFEL) system, typically formed from:
a layer of $Si_3N_4$,
a layer of ZnS:Mn, and
a layer of $Si_3N_4$;
a second electrode (which is a monolayer or multilayer) called the front or top electrode.

The device 2 is a direct surface light source, preferably a white light source, on either side of the glass sheet 1. The first direct light regions 31, 32 on either side of the glass 1 are thus defined.

The first direct light region 31, on the opposite side from the device 2, covers the central part of the first main face 11 over an area of 80% of the area of the glass, in other words 80% of the area of the face 11.

The second direct light region 32, on the same side as the device 2, extends over the entire main face 12.

The characteristics of the device 2 are adapted so that the luminance L1 of the first direct light region 31 is preferably greater than the luminance L2 of the second direct light region 32, (as shown by the thick arrow F1 and the thin arrow F2).

To have L1 greater than L2, the device is therefore principally emitting via the rear electrode. For example, L1 is chosen to be about 1000 cd/m$^2$ and L2 equal to about 500 cd/m$^2$ for visual comfort.

For example, as rear electrode, a transparent electrode is chosen, for example made of ITO with a light transmission of about 85%, and the front electrode is chosen to be a semireflective metal layer, for example a layer of silver between 10 and 20 nm in thickness.

In the direct light regions 31, 32, when the device 2 is turned on, the luminous panel 100 is transparent with a light transmission $T_L$ of around 65% and a light reflection $R_L$ of around 15%.

Similar performance levels may be obtained by choosing, as rear electrode, a thin metal layer, for example a layer of silver less than 10 nm in thickness.

The light transmission $T_L$ of the panel may be increased and its light reflection $R_L$ reduced by adding, for example to the front electrode, a dielectric (monolayer or multilayer) coating, for example a ZnO or $Si_3N_4$ coating, for example with a total thickness between 20 and 40 nm, without significantly modifying L1 and L2. Conversely, L2 may be increased and L1 reduced by varying the thicknesses and/or indices of the dielectric coating.

The device 2 is also a source of guided radiation in the thickness of the glass 1 by total reflections.

The guided radiation is extracted from the edges of the first face 11 by means of a diffusion layer 41, for example based on mineral scattering particles dispersed in a mineral binder. Thus, a light region 33 forming a peripheral luminous frame is defined, as shown in FIG. 1a, for example with a width equal to 5% of the width of the glass 1. As a variant, the diffusion layer 41 forms only lateral bands or peripheral longitudinal bands.

To favor extraction of the guided radiation, each of the edges forming the edge face 13 makes, with the second main face 12 associated with the light source 2, an external angle α of greater than 80° and comprises a mirror 14, for example a silver or copper metal layer.

Between about 15 and 30% of the light emitted by the device 2 on the first face 11 side leaves this first face 11 directly (direct light) and between about 70 and 85% of the light emitted by the device 2 on the first face 11 side is guided.

The luminance L3 is for example around 3000 cd/m$^2$. The frame 33 is more luminous than the central region 31 (as indicated symbolically by the thicker arrow F3).

The panel 100 may be intended for buildings, to be an illumination window, an illuminating door, a greenhouse wall or a glass roof, or else a vehicle side window or luminous roof. The first face 11 is the inner face (the most illuminating face).

When the device 2 is turned on, the central region 31 may be capable of preserving the intimacy of a person within a room, or passenger compartment during the night or in a dark environment. To do this, all that is required is for the light flux sent by the glazing to be at least equal to that reflected and returned by the room.

The panel 100 may form a double glazing unit, the device 2 preferably being located in the internal gas-filled space between the glass 1 and a possibly thinner additional glass.

The front and/or rear electrodes may have a low-emissivity or solar-control function.

The panel 100 thus designed may also serve as a transparent illuminating display shelf, luminous refrigerator shelf, illuminating transparent partition between two rooms, or the wall of an aquarium. The characteristics of the device 2 may then be adapted so that the luminance L1 of the first direct region 31 is substantially equal to the luminance L2 of the second direct light region 32.

To do this, front and rear electrodes are chosen to have similar or identical optical characteristics, for example ITO layers.

Thus, in the direct light regions 31, 32, when the device 2 is turned off, the luminous panel is transparent with a light transmission $T_L$ of around 80% and a light reflection $R_L$ of around 15%.

Front and rear electrodes may also be chosen to be made of a thin silver film with a thickness between 10 nm and 20 nm.

Thus, in the direct light regions 31, 32, when the device 2 is turned off, the luminous panel has a light transmission $T_L$ of around 50% and a light reflection $R_L$ of around 50%.

The light regions 31, 32 are uniform. As a variant, the panel 100 may also have at least one direct light region that is discontinuous and/or forms a design, logo or indication.

As a variant, the luminous panel 100 may also have, on each face 11, 12, a plurality of direct light regions, preferably occupying at least 50% or even 80% of the area of the glass, possibly of given geometry (rectangular, square, round, etc.) and/or uniformly distributed so as to provide a decorative illumination.

As a variant, the luminous panel 100 may also have a single illuminating face 11, for example to be a luminar, especially an illuminating tile or a ceiling, of negligible luminance L2. The luminous panel 100 may serve for illuminating a bathroom wall or a kitchen worktop. For example, a mirror layer, for example made of aluminum or silver with a thickness of around 100 nm, may be chosen as top electrode. It is also possible to have a mirror facing the second face 12. The luminous panel 100 may thus serve as a mirror in daytime and a source of illumination at night.

Figure 2:
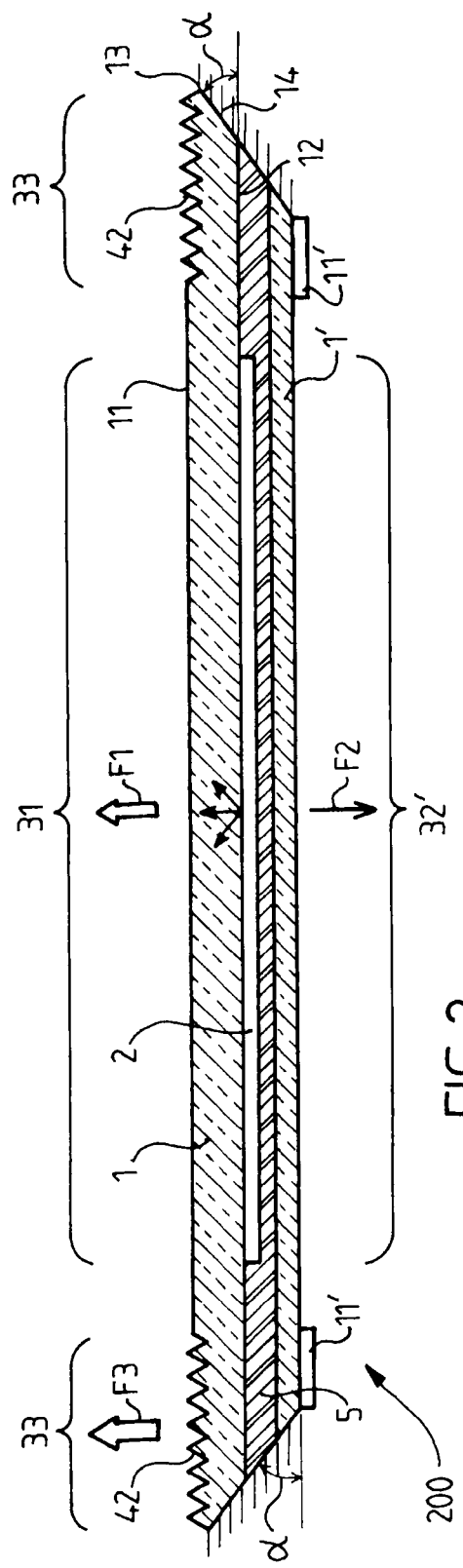
FIG. 2 shows a schematic longitudinal sectional view of a luminous panel in a second embodiment of the invention.

FIG. 2 shows a schematic longitudinal sectional view of a luminous panel 200 in a second embodiment of the invention.

This panel 200 differs from the panel 100 by the following technical characteristics:

the diffusion layer is replaced by a texturization of the glass 42, in the form of regular geometric patterns, for example micron-sized grooves, or, as a variant, by the addition of a diffusion plastic frame;

the glass pane 1 is laminated to a back glass pane 1', which is possibly thinner and/or beveled, via a lamination interlayer 5, such as a PVB interlayer, which is preferably extra clear in order to maintain satisfactory transparency, and an illuminating second face 12;

the device 2 extends over a limited central region occupying for example 60 to 70% of the area of the glass pane 1;

between the direct light region 31 and the light extraction zone 33, there is a nonluminuous transparent region (dark region);

the external face of the back glass pane 1' includes a metal mirror 11' facing the extraction zone 42 so as both to mask this region and to recover the backscattered light capable of being refracted; and preferably, the entire edge face of the panel (i.e. the edge face of the glass pane 1, the edge face of the sheet and the edge face of the back glass pane 1') comprises a mirror 14.

The device 2 is protected by the lamination. As a variant, it will be possible to form a double glazing unit by replacing in particular the PVB with an air layer or preferably a layer of inert gas.

The panel 200 may have the same functions as the luminous panel 100 or one of its variants described above, in particular so as:

to be intended for a building, to be an illuminating window, an illuminating door, a glazed opening, a glass roof, a greenhouse wall or else to be a vehicle side window or a luminous roof, especially with a luminance L1 that is greater than L2 but less than L3;

to be an illuminating transparent partition between two rooms or else to be an illuminating shelf, a refrigerator shelf, a wall of an aquarium, especially with a luminance L1 substantially equal to L2 but less than L3;

to have at least one direct light region forming a design, a logo or indication, especially with a luminance L1 less than L3;

to have, on each space 11, 12, a plurality of direct light regions; and to have a single illuminating face 11, for example to be a luminar, especially an illuminating tile or a ceiling, the glass back pane 1' being for example provided with a mirror or replaced with a mirror or else the front electrode being a mirror.

Figure 3:
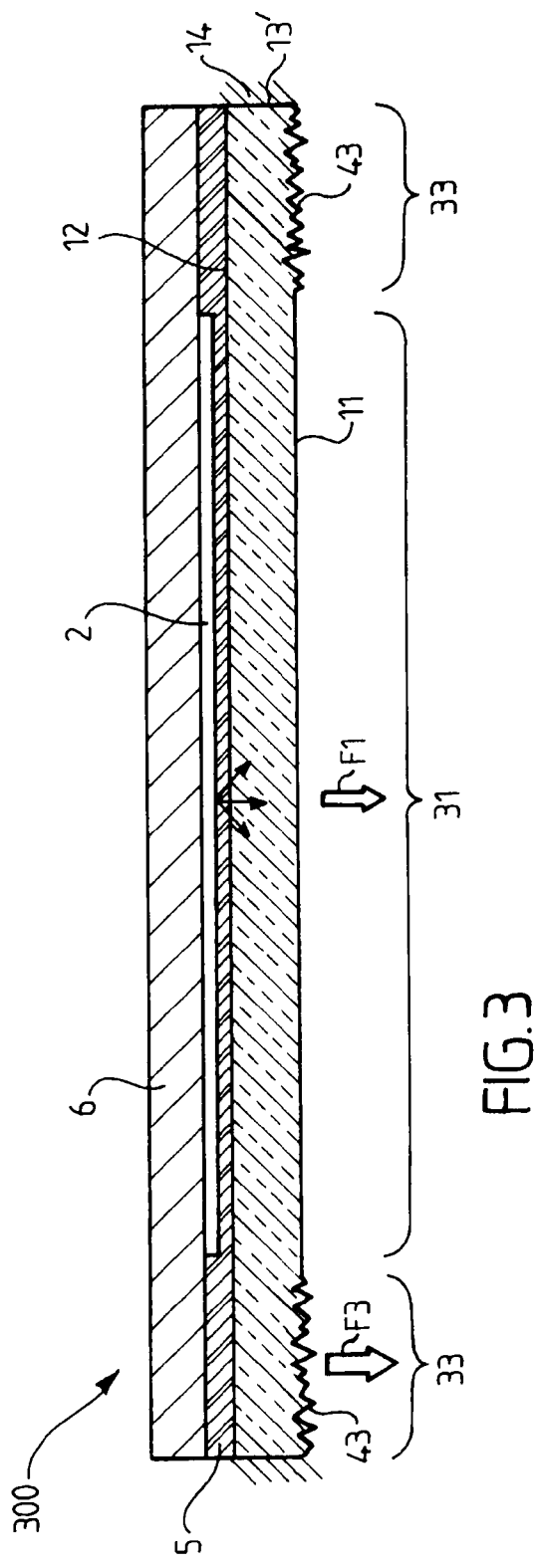
FIG. 3 shows a schematic longitudinal sectional view of a luminous panel according to the third embodiment of the invention.

FIG. 3 shows a schematic longitudinal sectional view of a luminous panel 300 in a third embodiment of the invention.

This luminous panel 300 differs from the panel 100 by the following technical characteristics:

the diffusion layer is replaced with a rough region of the glass 43, making it diffusing, for example roughened by sandblasting, chemical etching or, as a variant, by the addition of a diffusion plastic frame;

the glass pane 1 is laminated to a flat element 6 that is possibly opaque or at least reflective on the surface, possibly thinner and/or beveled, via a lamination interlayer 5, such as one made of PVB, preferably a thin and/or extra clear interlayer;

the device 2 extends over a limited central region occupying 60 to 70% of the area of the glass pane 1 and is joined to the flat element 6, the device 2 emitting mainly via the front electrode (the one closer to the glass pane 1), which is chosen to be transparent, for example made of ITO;

the panel 300 has only a single illuminating face 11; and optionally, the edges 13' of the glass pane 1 are straight edges.

The element 6 may be a metal foil, made of silver or aluminum, serving as rear electrode.

The luminous panel 300 may have certain of the functions already described, in particular so as:

to be a luminar, especially an illuminating tile or a ceiling, with a luminance L3 that remains greater than the luminance L1;

to have at least one direct light region forming a design, a logo or an indication; and to have a plurality of direct light regions on the face 11.

FIGS. 4a and 4b show, respectively, schematic front and longitudinal sectional views of a luminous panel 400 in a fourth embodiment of the invention.

This panel 400 differs from the panel 100 by the following technical features:

the electroluminescent device 2 is replaced with light-emitting diodes (LEDs) 2', these diodes emitting for example in the blue, having for example a "bat wing" emission pattern and forming an indicating luminous element 31', for example an arrow;

the diffusion layer is replaced with a layer 44 based on luminescent particles that are both scattering and emitting in the yellow in order to produce white light from blue light, for example a $Y_3Al_5O_{12}$:Ce layer, this layer 44 forming two lateral peripheral bands;

the panel has a single illuminating face 11, which has, in a central region, a layer 7 based on transparent phosphor particles emitting in the yellow in order to produce white light from blue light, for example what are called "core-shell" particles, for example based on ZnS for the shell and CdSe for the core; and the face 12 comprises two mirror layers 12' facing the diffusion bands 44.

When the diodes 2' are turned off, the luminous panel in the direct light region 31 is overall transparent with an overall light transmission $T_L$ of around 85% and a light reflection $R_L$ of around 15%.

The diodes 2' may also have a decorative function and may be uniformly distributed in the central region.

In a variant, since the diodes 2' emit white light, the layer 7 may be omitted and the layer 44 may be simply based on the scattering particles, for example alumina particles.

In another variant, since the diodes 2' emit in the near-UV, a layer of transparent phosphors that can be excited in the near-UV and a diffusion layer with phosphors that can be excited in the near-UV are therefore chosen.

In another variant, the layer 7 is omitted and the electroluminescent device 2 is retained and forms the luminous signaling element 31'.

The light-emitting diodes 2' may also be replaced with a TDEL forming the arrow 31' or any other signaling element. The layer 7 is therefore omitted.

FIGS. 5a and 5b show, respectively, schematic front and longitudinal sectional views of a luminous panel 500 in a fifth embodiment of the invention.

This luminous panel 500 differs from the panel 100 by the technical features described below.

The electroluminescent device 2 is replaced with a transparent photoluminescent layer 2", which is centered and extends over 80% of the face 11. This layer 2" is based on UV-excitable phosphor nanoparticles emitting radiation in one or more wavelengths in the visible, for example core-shell particles, for example based on ZnS for the shell and CdSe for the core.

L2 is identical to L1. Furthermore, when the layer 2" is not excited, the luminous panel in the direct light regions 31, 32 is transparent with a light transmission $T_L$ of around 85% and a light reflection $R_L$ of around 15%.

The panel 500 includes a source of guided radiation, chosen to be UV, preferably near-UV, radiation, and is placed on a straight edge and with no mirror on the edge face 13. These are for example a series of diodes 20 in the form of semiconductor chips bonded onto the edge face. As a variant, a neon tube is chosen.

The UV radiation propagates by total reflections in the thickness of the glass pane 1 and is extracted via a lateral diffusing band 44' based on luminescent particles that convert the UV into visible light and on scattering particles, for example a mixture of $CaS:(Eu,Tm)^{2+}$ emitting in the red, $SrAl_2O_4:Eu^{2+}$ emitting in the green and core-shell particles emitting in the blue. This extraction takes place on the same face 11.

The radiation emitted by the layer 2" toward the substrate is partly guided and extracted in the region 44'. L3 may be around 1000 cd/m².

Of course, for each of the embodiments, it is possible to substitute or add certain features of one or more of the other embodiments, especially the type of extraction, the monolithic or multiple nature of the panel, the type of light source, the arrangement and extent of the light source, and the choice of one or two luminous faces.

The invention claimed is:

1. An illuminated panel that provides differentiated lighting comprising:
   a flat transparent substrate having a section, two main faces and a given thickness,
   at least one zone of direct light by means of a light source associated with one of the main faces,
   a visible radiation source, said radiation being guided by total reflections in the thickness of the substrate,
   at least one zone for extraction of the guided radiation, said extraction zone being associated with one of the main faces in order to form another illuminated zone distinct from the zone of direct light;
   wherein the light source is a single one, consists of an electroluminescent device, and forms the source of said guided radiation, and on the side of the main face associated with the extraction zone, the zone of direct light has a luminance less than the luminance of the other illuminated zone thus providing differentiated lighting;
   wherein the zone of direct light occupies a surface equal to at least 50% of the main face of the substrate; and
   wherein the zone of direct light, when the light source is turned off, the illuminated panel is transparent or substantially transparent.

2. The illuminated panel of claim 1, which has an overall light transmission TL greater than 20% and light reflection RL less than 50%.

3. The illuminated panel according to claim 1, wherein the two main faces each have a zone of direct light, their luminance, which are L1 on the side opposite the source of the light and L2 on the side of the light source, are distinct.

4. The illuminated panel of claim 3, wherein L1 is at least two times greater than L2.

5. The illuminated panel of claim 4, wherein L1 is less than or equal to 1200 cd/m$^2$ and L2 is less than or equal to 500 cd/m$^2$.

6. The illuminated panel according to claim 1, wherein the luminance L3 of the extraction zone is greater than or equal to 1500 cd/m$^2$.

7. The illuminated panel according to claim 1, wherein the light source is directly over one of the main faces.

8. The illuminated panel according to claim 1, wherein the extraction zone is associated with the main face opposite the main face with the light source.

9. The illuminated panel according to claim 1, wherein the light source is glued or laminated with another flat substrate; is laminated with another flat substrate which is transparent with the aid of a laminating insert; or is laminated with another flat substrate which is transparent with the aid of a laminating insert which is extraclear.

10. The illuminated panel according to claim 1, wherein the substrate forms a sheet of glass of a double glazing and the light source is arranged inside the double glazing.

11. The illuminated panel according to claim 1, wherein extraction is obtained by at least one of the following means arranged in the extraction zone: a diffusing layer, a diffusing substrate, or a diffusing element, which is added onto the transparent substrate.

12. The illuminated panel according to claim 1, comprising at least one means for extraction arranged in the extraction zone selected from the group consisting of a diffusing layer that is inorganic; a diffusing substrate that is textured or rough; and a diffusing element that is textured or rough; which is added onto the transparent substrate.

13. The illuminated panel of claim 1, wherein the transparent substrate is glass that comprises at least one microtextured, sandblasted or acid-frosted zone to form the extraction zone.

14. The illuminated panel according to claim 1, wherein at least one of the edges of the section forms with the main face associated with the light source an exterior angle a greater than or equal to 45° and less than 90°.

15. The illuminated panel according to claim 1, wherein at least one of the edges of the section is reflective and, optionally, comprises a mirror.

16. The illuminated panel according to claim 1, wherein the transparent substrate is a glass having a coefficient of absorption less than 2.5 m$^{-1}$.

17. The illuminated panel according to claim 16, wherein said coefficient of absorption is less than 0.7 m$^{-1}$ at the wavelength of the guided radiation.

18. The illuminated panel according to claim 1, wherein the thickness of the transparent substrate is at least 5 mm.

19. The illuminated panel according to claim 1, which forms an illuminating panel and/or a decorative panel and/or an architectural panel and/or a signage or display panel.

20. The illuminated panel according to claim 1, which forms an integral part of a building, roadway or municipal lighting, furniture or a vehicle; wherein said panel is a glazing intended for a building, a curtain wall, an illuminating window, glazing intended for a transport vehicle, such as a rear window, a side window or a motor vehicle sunroof, or intended for any other land, sea or air vehicle, a panel for roadway or municipal lighting, glazing intended for municipal or domestic furniture, an illuminating tile, a ceiling, a bus shelter panel, a wall of a display cabinet, a jewelers' display case or a shop window, a shelf or furniture element, a front face for an item of furniture, an illuminating refrigerator shelf, an aquarium wall, or a greenhouse.

21. The illuminated panel of claim 1, wherein the light source is a single one and consists of a device having an organic electroluminescent layer.

22. An illuminated panel comprising a direct light region and another luminous region separate from the direct light region;
   wherein the illuminated panel comprises:
      a flat transparent substrate having two main faces, an edge face, and has a given thickness, and
      a light source associated with one of the main faces of the flat transparent substrate,
      a visible and/or ultraviolet radiation source whose radiation is guided by total reflections in the thickness of the substrate which may be the same or different than the light source;
   wherein the direct light region of the illuminated panel occupies a surface equal to at least 50% of the main face of the substrate;
   wherein the another luminous region of the illuminated panel is associated with one of the main faces of the substrate, emits guided radiation received from the substrate, and forms an illuminated zone distinct from the direct light region; and
   wherein the direct light region of said illuminated panel is transparent or substantially transparent, having a light reflection ($R_L$) of 50% or less, when the direct light source is turned off.

23. The illuminated panel of claim 22, wherein the light source and the visible and/or ultraviolet radiation source are provided by a single UV and/or visible radiation source that is associated with one of the main faces of the substrate.

24. The illuminated panel of claim 22, wherein the light source is a single one and consists of a device having an organic electroluminescent layer.

* * * * *